United States Patent [19]

Morita

[11] Patent Number: 5,143,454
[45] Date of Patent: Sep. 1, 1992

[54] ANTI-VIBRATION LINEAR MOTION GUIDE UNIT

[75] Inventor: Kunihiko Morita, Koganei, Japan

[73] Assignee: Nippon Thompson Co., Ltd., Tokyo, Japan

[21] Appl. No.: 675,206

[22] Filed: Mar. 26, 1991

[30] Foreign Application Priority Data

Mar. 27, 1990 [JP] Japan ............................. 2-31475[U]

[51] Int. Cl.⁵ .............................................. F16C 29/02
[52] U.S. Cl. .......................................... 384/37; 384/42
[58] Field of Search ................. 384/25, 37, 42, 43–45, 384/54

[56] References Cited

U.S. PATENT DOCUMENTS

| | | | |
|---|---|---|---|
| 3,443,461 | 5/1969 | De Biasse | 384/37 X |
| 4,918,846 | 4/1990 | Tsukada | 384/45 X |
| 4,923,311 | 5/1990 | Gibbs et al. | 384/54 X |
| 4,968,155 | 11/1990 | Bode | 384/45 |

FOREIGN PATENT DOCUMENTS 58-6010  1/1983  Japan .
61-116119  6/1986  Japan .

*Primary Examiner*—Thomas R. Hannon
*Attorney, Agent, or Firm*—Skjerven, Morrill, MacPherson, Franklin & Friel

[57] ABSTRACT

A sliding contact type linear motion guide unit having at least one of desired anti-vibration and braking functions is provided. The unit includes a rail extending over a desired length, a slider movably mounted on the rail and a sliding member interposed between the rail and the slider. The sliding member includes an elastic solid member fixedly attached to the slider and a contact member fixedly attached to the elastic solid member and having a contact surface in sliding contact with the rail. In the preferred embodiment, the elastic solid member is constructed by a corrugated spring, rubber, a synthetic resin or the like so that the contact pressure between the contact member and the rail can be maintained substantially unchanged and uniformly.

12 Claims, 3 Drawing Sheets

ANTI-VIBRATION LINEAR MOTION GUIDE UNIT

BACKGROUND OF THE INVENTION

1. Field of the Invention

This invention generally relates to a linear motion guide unit suitable for use in moving parts of machining tools, precision processing apparatuses and test apparatuses, and, in particular, to a linear motion guide unit having an anti-vibration or a braking function. More specifically, the present invention relates to a sliding contact type linear motion guide unit having a sliding contact between a rail and a slider.

2. Description of the Prior Art

A linear motion guide unit having braking function and/or an anti-vibration function is well known in the art and is typically described in the Japanese Utility Model Laid-open Pub. No. 58-6010 and the Japanese Pat. Laid-open Pub. No. 61-116119. As illustrated in these publications, a typical linear motion guide unit having a braking function and/or an anti-vibration function includes a rail, a slider, a plurality of rolling members interposed between the rail and the slider, and a frictional member also interposed between the rail and the slider. Another such prior art linear motion guide unit includes a rail, a pair of end sliders, a plurality of rolling members interposed between each of the end sliders and the rail, an intermediate slider located between the pair of end sliders, and a small gap defined between the rail and the intermediate slider and filled with a lubricant, thereby serving as a fluidic damper.

However, in the former prior art structure, since the rolling members and the frictional member are both incorporated in the single slider, the mounting location of the frictional member is limited, which in turn causes limitations in its braking function and/or its anti-vibration function, and the structure is complicated and thus difficult to manufacture. On the other hand, in the latter fluidic damper case, there still remains difficulty in maintaining the lubricant between the rail and the slider without significant leaks and thus this technique lacks practicality.

SUMMARY OF THE INVENTION

In accordance with the present invention, there is provided a novel linear motion guide unit comprising a rail extending straight over a desired length and a slider slidably mounted on the rail. Fixedly attached to the slider is a two-part sliding member which includes an elastic portion and a contact portion. The elastic portion is fixedly attached to the slider and the contact portion has a contact surface which is brought into a sliding contact with the rail. Thus, the contact portion is preferably comprised of a material having a low coefficient of friction. The elastic portion is comprised of any elastic solid material, such as a corrugated spring, rubber or a synthetic resin. Thus, the contact portion of the sliding member is in sliding contact with the rail and the elastic portion is interposed between the contact portion and the slider, so that the contact portion is normally in contact with the rail under pressure. In alternative structures, the elastic and contact portions of the sliding member may be constructed separately or in an integrated structure. In accordance with the present invention, since the contact portion comprised of a material having a relatively low coefficient of friction is in sliding, surface contact with the rail, the sliding resistance is relatively low, thereby allowing to provide a smooth relative motion between the rail and the slider. In addition, the elastic portion is present between the contact portion of the sliding member, which is in sliding, surface contact with the rail, and the slider, the level of contact pressure between the contact portion and the rail can be adjusted to a desired level to thereby obtain a desired frictional resistance and thus a desired braking characteristic between the rail and the slider. In addition, the elastic portion also serves to absorb any vibration applied from either of the rail and the slider so that no vibration is transmitted from one of the rail and the slider to the other undesirably. Besides, even if wear occurs in the contact portion, the sliding resistance is maintained substantially at constant since the elastic portion keeps the contact portion in contact with the rail under pressure.

It is therefore a primary object of the present invention to provide an improved linear motion guide unit having at least one of desired anti-vibration and braking functions.

Another object of the present invention is to provide an improved anti-vibration linear motion guide unit simple in structure, easy to manufacture and thus low at cost.

A further object of the present invention is to provide an improved linear motion guide unit whose sliding resistance remains substantially unchanged.

A still further object of the present invention is to provide an improved sliding contact type linear motion guide unit having a sliding contact between a rail and a slider.

Other objects, advantages and novel features of the present invention will become apparent from the following detailed description of the invention when considered in conjunction with the accompanying drawings.

DESCRIPTION OF THE PREFERRED EMBODIMENTS

Figure 1:
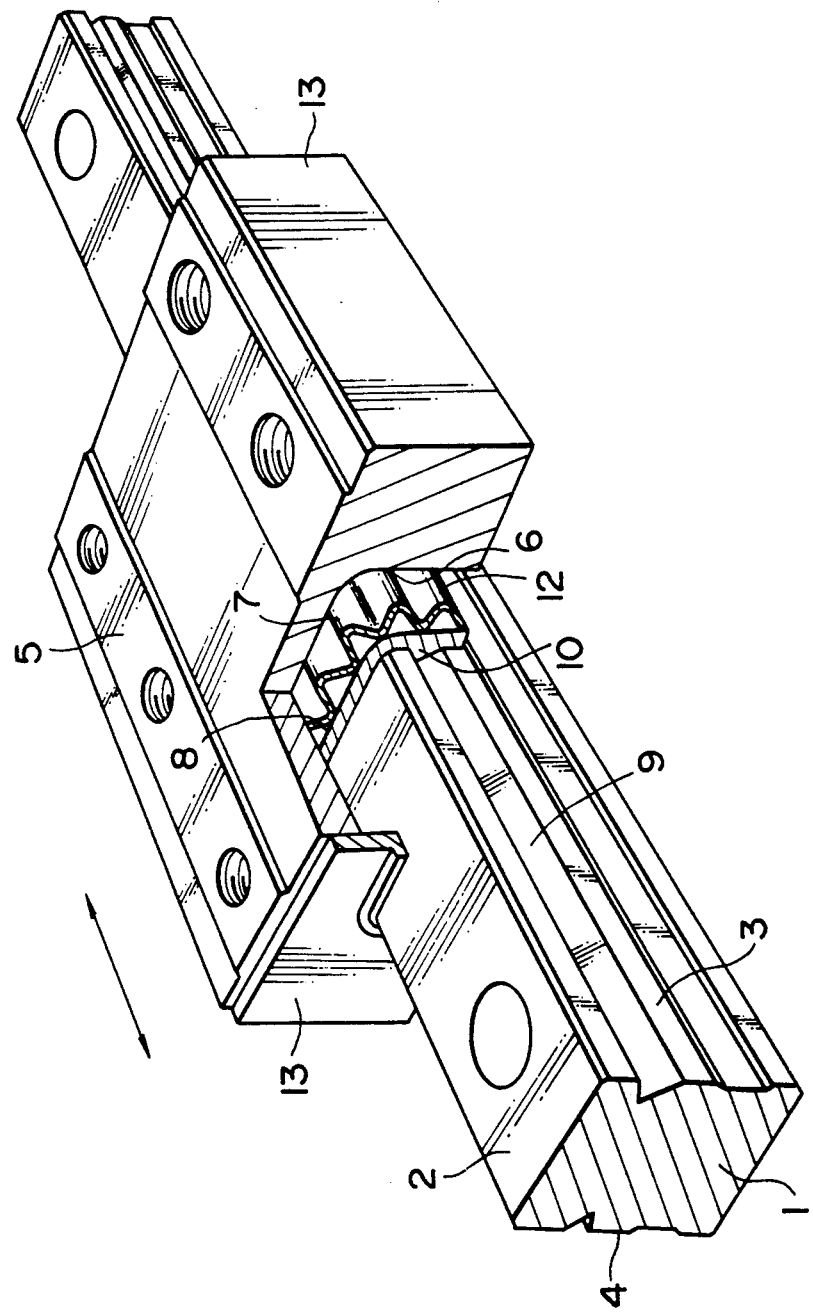
FIG. 1 is a schematic illustration showing in perspective view an anti-vibration linear motion guide unit constructed in accordance with one embodiment of the present invention.
Figure 2:
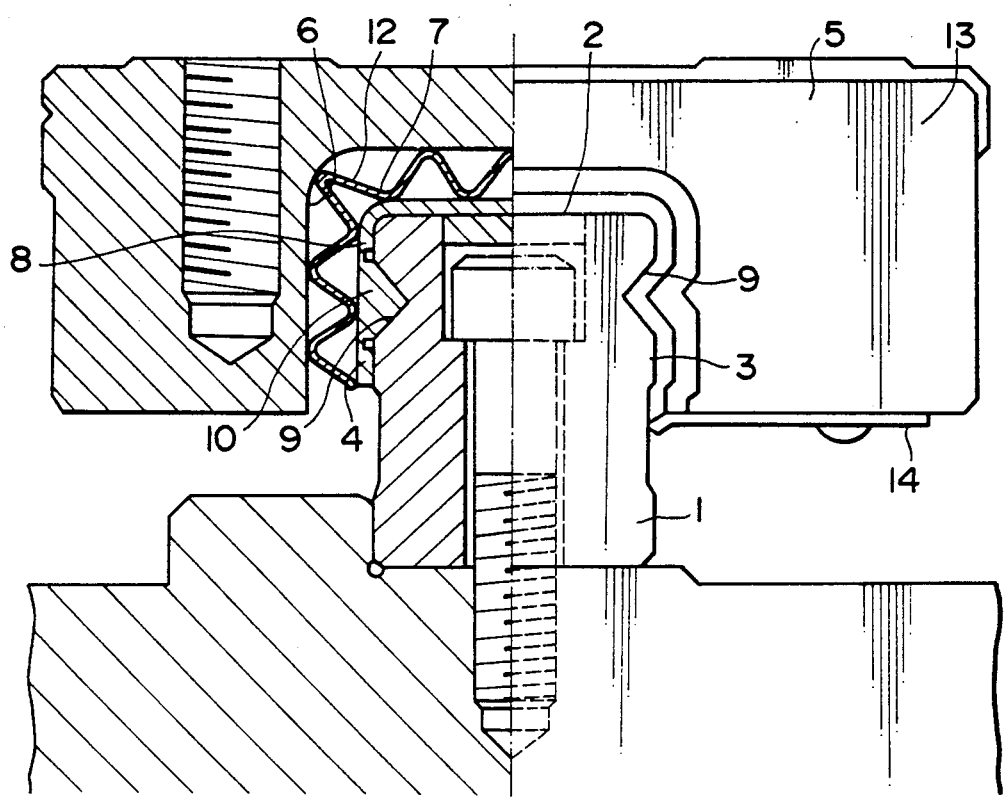
FIG. 2 is a schematic illustration showing partially in transverse cross section the unit shown in FIG. 1.

Referring to FIGS. 1 and 2, there is schematically shown an anti-vibration linear motion guide unit constructed in accordance with one embodiment of the present invention. As shown, the present linear motion guide unit includes a rail 1 which extends straight over a desired length and which is generally rectangular in cross section and thus has a top guide surface 2 and a pair of side guide surfaces 3 and 4. In this embodiment, the top guide surface is a flat sliding surface and each of the pair of side guide surfaces 3 and 4 is formed with a guide groove 9, which is generally V-shaped in cross section and extends in parallel with the longitudinal axis of the rail 1. It is to be noted that this guide rail 1 may be used as a guide rail of a rolling contact type linear motion guide unit, which also includes a slider and a plurality of rollers interposed between the guide rail and the slider.

The present linear motion guide unit also includes a slider 5 which is generally U-shaped in cross section and thus slidably mounted on the rail 1 in a straddling fashion. A generally U-shaped elastic member 7 is fixedly attached to an inner surface 6 of the slider 5 and a generally U-shaped contact member 8 is fixedly attached to the elastic member 7. The contact member 8 has a top sliding surface, which is in sliding contact with the top guide surface 2 of the rail 1, and a pair of side guide ridges 10, each of which is generally triangular in cross section and in sliding contact with the corresponding one of the pair of guide grooves 9 of the rail 1. Since the side guide ridges 10 are in sliding contact with the respective guide grooves 9 of the rail 1 and the contact member 8 is fixedly attached to the slider 5 through the elastic member 7, the slider 5 slidingly moves along the rail 1 in either direction. The contact member 8 is preferably comprised of a material having a relatively low coefficient of friction, such as a synthetic resin, a composite material including a synthetic resin and a metal, or a composite material including a metal and a chemical compound.

The elastic member 7 may be comprised of any desired elastic solid material such that elastic deformation may be provided between the slider 5 and the contact member 8. In the illustrated embodiment, the elastic member 7 includes a corrugated leaf spring 12 which has been bent generally in the shape of "U." Since the elastic member 7 is generally U-shaped in cross section and in intimate contact with the inner surface 6 of the slider 1 and the contact member 8 is also generally U-shaped in cross section and in intimate contact with the elastic member 7, the top and side sliding guide surfaces of the contact member 8 are in sliding contact with the top and side guide surfaces of the rail 1 under pressure substantially uniformly. In the illustrated embodiment, a pair of end plates 13 are attached at the front and rear ends of the slider 5 and a retainer plate 14 is also attached at the bottom of the slider 5 so as to keep the elastic member 7 and the contact member 8 in position.

It is to be noted that the slider 5 may also be used as a slider which is in rolling contact with the rail 1 if a pair of endless circulating paths, including a load path section, a return path section and a pair of curved connecting path sections, each connecting the corresponding ends of the load and return path sections, is formed in the slider 5 and a plurality of rollers are provided in each of the endless circulating paths. In this case, the rollers are in rolling contact with the V-shaped side grooves 9. Thus, the slider 5 and the rail 1 of the present invention may be used to manufacture the present sliding contact linear motion guide unit having a sliding member or a rolling contact linear motion guide unit having rolling members.

Figure 3:
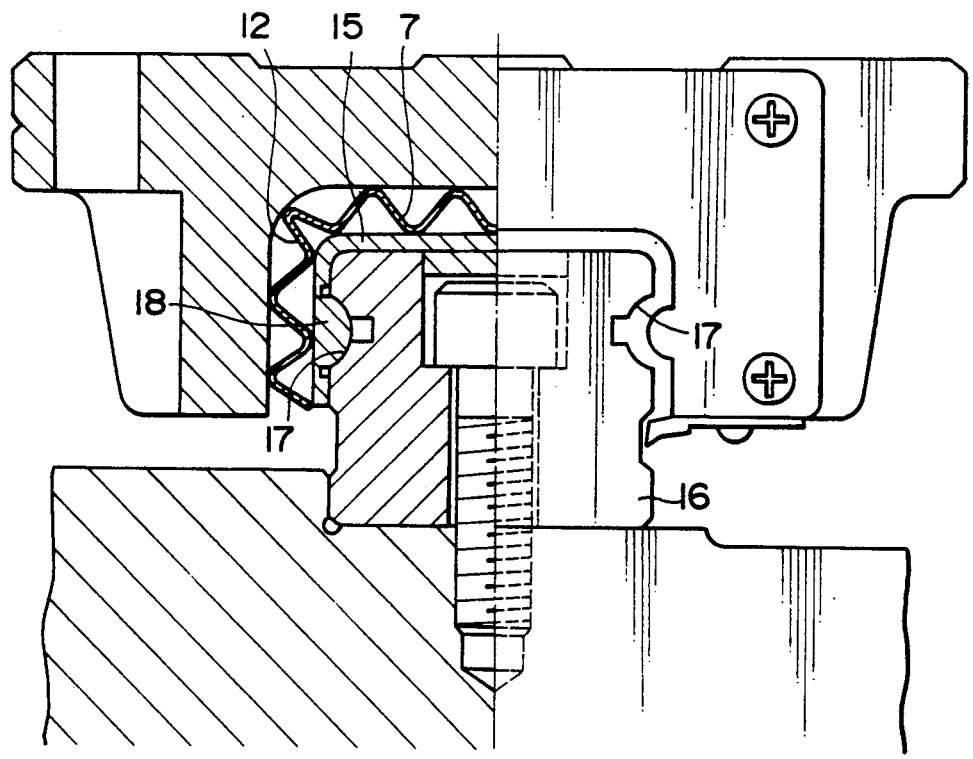
FIG. 3 is a schematic illustration showing partially in transverse cross section an anti-vibration linear motion guide unit constructed in accordance with another embodiment of the present invention.

FIG. 3 illustrates an anti-vibration linear motion guide unit constructed in accordance with another embodiment of the present invention. This embodiment is similar in many respects to the embodiment shown in FIGS. 1 and 2, and, thus, like elements are indicated by like numerals. This linear motion guide unit includes a guide rail 16 which is similar in many respects to the guide rail 1 of the previous embodiment excepting that the guide rail 16 has a pair of side guide grooves 17 which are generally semi-circular in cross section. The guide rail 16 may be fixedly attached to any desired object by means of bolts as shown. This embodiment also includes the slider 5 and the elastic member 7 which are identical to those provided in the previous embodiment. This embodiment also includes a contact member 15 which is also similar in many respects to the contact member 8 of the previous embodiment, excepting that the contact member 15 of the present embodiment includes a pair of side guide ridges 18 each of which is generally semi-circular in cross section and is associated with a corresponding one of the guide grooves 17. In this embodiment, the guide rail 16 may be used as a guide rail of a rolling contact type linear motion guide unit having balls as rolling members.

Figure 4:
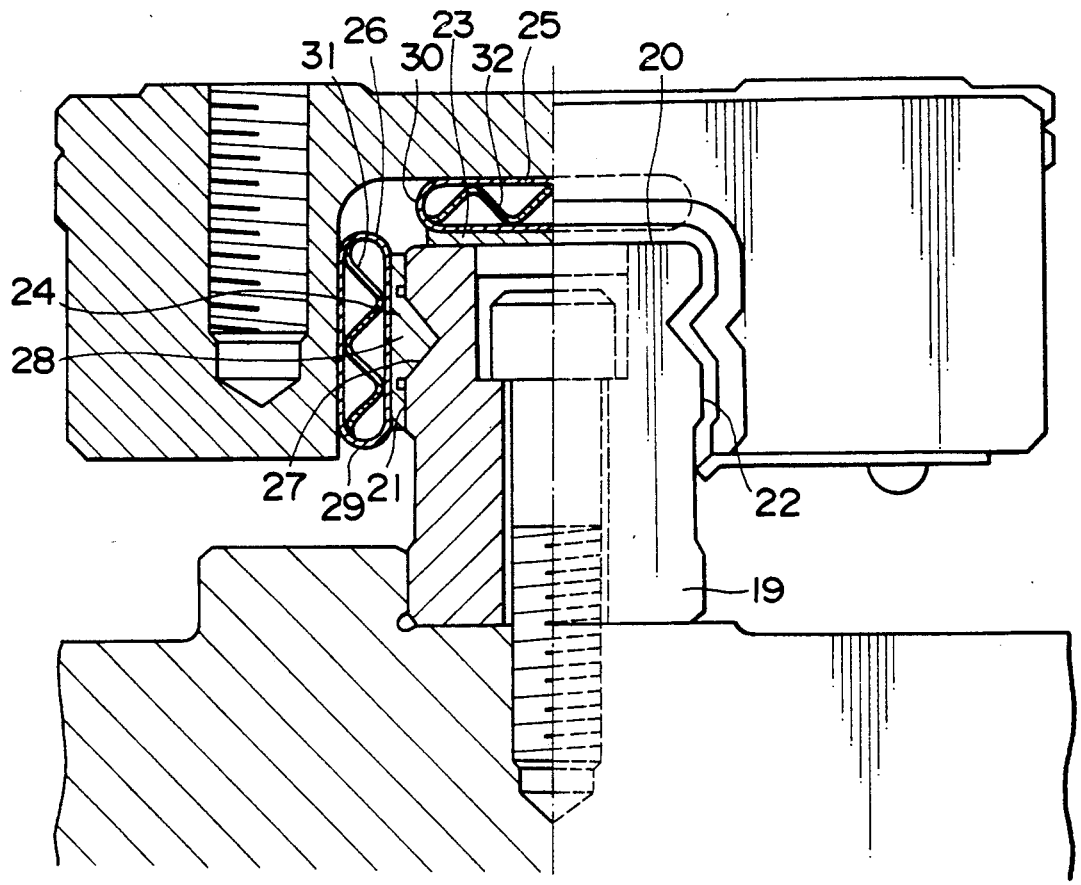
FIG. 4 is a schematic illustration showing partially in transverse cross section an anti-vibration linear motion guide unit constructed in accordance with a further embodiment of the present invention.
Figure 5:
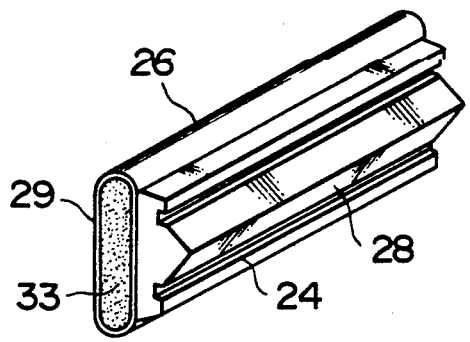
FIG. 5 is a schematic illustration showing in perspective view the side sliding member provided in the unit shown in FIG. 4.

FIGS. 4 and 5 illustrate a sliding contact linear motion guide unit constructed in accordance with a further embodiment of the present invention. As in the previously described embodiments, this embodiment also has a sliding contact between a rail and a slider for attaining at least one of anti-vibration and braking functions rather than a rolling contact therebetween. However, this embodiment differs from the previous embodiments in that a plurality of separate sliding members are provided between a rail and a slider. Described more in detail with reference to FIGS. 4 and 5, the present linear motion guide unit includes a rail 19 which extends straight over a desired length and which is generally rectangular in cross section and thus has a flat top guide surface 20 and a pair of side guide surfaces 21 and 22, each of which is formed with a guide groove 27 extending in parallel with the longitudinal axis of the rail 19 and having a generally V-shaped cross section. The rail 19 is fixedly attached to a desired object by means of bolts.

The present linear motion guide unit also includes a slider 5 which may be identical to those sliders 5 provided in the previous embodiments. Also provided as interposed between the rail 19 and the slider 5 is a slider member for providing a sliding contact between the rail 19 and the slider 5. In the present embodiment, the slider member, in fact, has three separate slider sub-members, i.e., a top slider sub-member and a pair of side slider sub-members. The top slider sub-member includes a top contact member 23, which is in sliding contact with the top guide surface 20 of the rail 19, and a top elastic member 25, which is fixedly attached between the slider 5 and the top contact member 23. And, each of the side slider sub-members includes a side contact member 24, which is in sliding contact with a corresponding one of the side guide surfaces 21 and 22 of the rail 19, and a side elastic member 26, which is fixedly attached between the slider 5 and the side contact member 24. The side contact member 24 is formed with a guide ridge having a generally triangular cross section in commensurate with the cross section of the guide groove 27 of the rail 19. Thus, the top and side slide sub-members of the present embodiment can be formed by dividing the slide member of the first embodiment into three sections.

In the embodiment shown in FIG. 4, each of the top and side elastic members 25 and 26 is identical in structure and includes a corrugated leaf spring 32 or 31 and an enclosure 30 or 29 which encloses the corrugated leaf spring 32 or 31, respectively, and which is comprised of an elastic solid material, such as a thin metal plate having resiliency, rubber, a synthetic resin or the like.

In the embodiment shown in FIG. 5, the elastic member 26 includes an enclosure 29 and a filler 33 of an elastic solid material, such as rubber or a synthetic resin, which is integrally filled in the enclosure 29. By selecting an appropriate elastic solid material for the filler 33, a desired contact pressure can be set between the sliding members 23, 24 and the guide rail 19. As a modification of this embodiment, the elastic member 26 (and also 25) may be formed entirely by the elastic solid material 33 of either rubber or a synthetic resin without the enclosure 29, if desired.

In one application, the present sliding contact type linear motion guide unit can be advantageously used in combination with one or more rolling contact type linear motion guide units so as to provide at least one of desired anti-vibration and braking functions. For example, the present sliding contact type linear motion guide unit may be advantageously disposed between a pair of rolling contact type linear motion guide units in a back-to-back relation. Alternatively, the present linear motion guide unit can also be used as an independent sliding contact type linear motion guide unit having no rolling contact. It is also to be noted that although a rail having a generally rectangular cross section has been used in all of the above-described embodiments, use may also be made of a rail having any desired cross sectional shape, such as a T-shaped cross sectional shape.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A sliding contact type linear motion guide unit, comprising:
   a rail extending over a desired length and including at least one guide surface;
   a slider mounted on said rail to be moveable relative to said rail therealong; and
   a sliding member interposed between said rail and said slider, said sliding member including an elastic solid member and a contact member, whereby said elastic solid member is disposed between said slider and said contact member and said contact member has a contact surface which is in sliding contact with said at least one guide surface of said rail;
   wherein said rail has a top guide surface and a pair of side guide surfaces and said slider has a top inner surface opposite to said top guide surface of said rail and a pair of inner side surfaces, each opposite to a corresponding one of said side guide surfaces of said rail, and wherein said sliding member includes a top sliding member portion interposed between said top guide surface of said rail and said top inner surface of said slider and a pair of side sliding member portions, each of which is interposed between a corresponding opposed pair of said side guide surfaces of said rail and said inner side surfaces of said slider.

2. The unit of claim 1, wherein said sliding member has an integrated structure.

3. The unit of claim 1, wherein said top sliding member portion is connected to each of said pair of side sliding member portions.

4. The unit of claim 1, wherein said rail is formed with a first guiding means and said contact member is formed with a second guiding means engageable with said first guiding means when assembled.

5. The unit of claim 4, wherein said first guiding means includes at least one guide groove formed in said rail extending in parallel with a longitudinal axis thereof and said second guiding means includes at least one ridge which can be fitted into said guide groove when assembled.

6. The unit of claim 1, wherein said contact member comprises a material having a relatively low coefficient of friction.

7. The unit of claim 6, wherein said material is selected from the group consisting of a synthetic resin, a combination of a synthetic resin and a metal and a combination of a synthetic resin and a chemical material.

8. The unit of claim 1, wherein said elastic solid member is selected from the group consisting of a corrugated spring, rubber and a synthetic resin.

9. The unit of claim 1, wherein said elastic solid member includes an enclosure of a predetermined shape and a corrugated leaf spring contained in said enclosure.

10. The unit of claim 1, wherein said elastic solid member includes an enclosure of a predetermined shape and a fill sealingly contained in said enclosure.

11. The unit of claim 10, wherein said enclosure is comprised of an elastic material and said fill is selected from the group consisting of rubber and a synthetic resin.

12. The unit of claim 1, wherein said top sliding member portion is separate from each of said pair of side sliding member portions.

* * * * *